United States Patent [19]

Dickinson

[11] 4,380,960
[45] Apr. 26, 1983

[54] POLLUTION-FREE LOW TEMPERATURE SLURRY COMBUSTION PROCESS UTILIZING THE SUPER-CRITICAL STATE

[76] Inventor: Norman L. Dickinson, 16230 Greenwood LA., Monte Sereno, Calif. 95030

[21] Appl. No.: 261,143

[22] Filed: May 6, 1981

Related U.S. Application Data

[63] Continuation-in-part of Ser. No. 948,682, Oct. 5, 1978, Pat. No. 4,292,953.

[51] Int. Cl.³ .............................................. F23D 1/00
[52] U.S. Cl. .................................... 110/347; 110/348; 110/238; 122/7 C; 431/4
[58] Field of Search .............. 110/238, 347, 348, 106; 122/7 C, 4 R; 431/4

[56] References Cited

U.S. PATENT DOCUMENTS

| | | | |
|---|---|---|---|
| 1,933,254 | 10/1933 | Goodell | 122/7 C |
| 1,970,258 | 8/1934 | Textor | 110/238 |
| 1,976,528 | 10/1934 | Hales et al. | 110/238 |
| 2,050,400 | 8/1936 | Wagner | 122/7 C |
| 2,362,066 | 11/1944 | Hales et al. | 110/238 |
| 2,808,011 | 10/1957 | Miller et al. | 110/238 |
| 2,860,611 | 11/1958 | Allen | 122/7 C |
| 3,625,186 | 12/1971 | Herbst | 122/7 C |
| 3,996,026 | 12/1976 | Cole | 110/238 |
| 4,094,625 | 6/1978 | Wang et al. | 110/238 |
| 4,292,953 | 10/1981 | Dickinson | 110/106 |

Primary Examiner—Henry C. Yuen

[57] ABSTRACT

A continuous process for the combustion of solid fuels under conditions such that flue gas is essentially free of particulates and oxides of sulfur and nitrogen. Fuel is charged as an aqueous slurry and additional water condensed from the flue gas may be recycled to the pressurized combustion zone. Combustion is promoted both by water vapor and alkali added with the fuel slurry, while the alkali serves also to neutralize and remove sulfur in completely oxidized, or sulfate, form. Heat of combustion raises the temperature of the reactants above the critical temperature of water, forming a hot fluid from which useful heat is transferred. Under the pressure of the system, heat recovery results in condensation of water, retaining and slurry product ash and providing recycle water, which helps to control reaction temperature as well as to promote the combustion.

16 Claims, 6 Drawing Figures

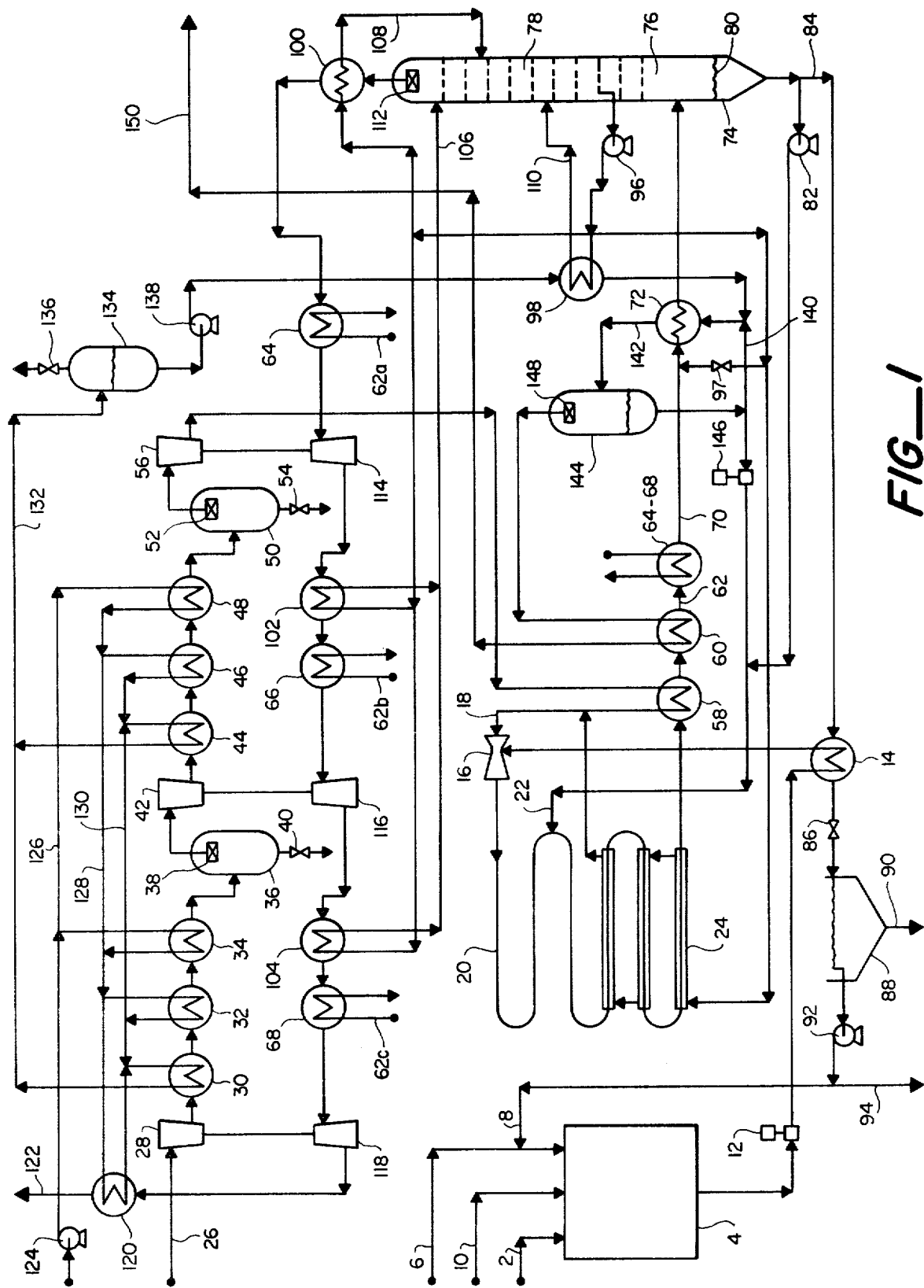
FIG_1

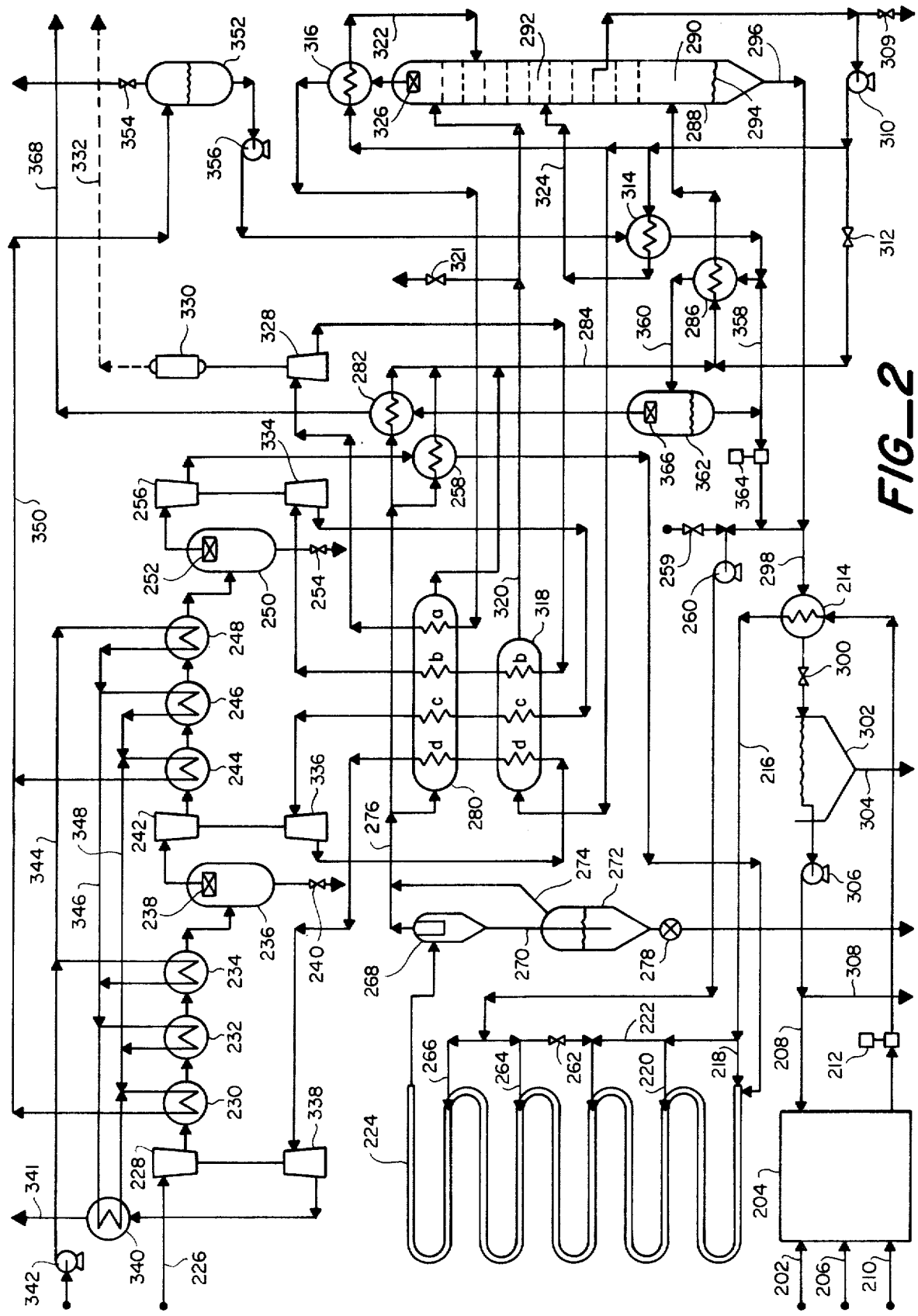
FIG_2

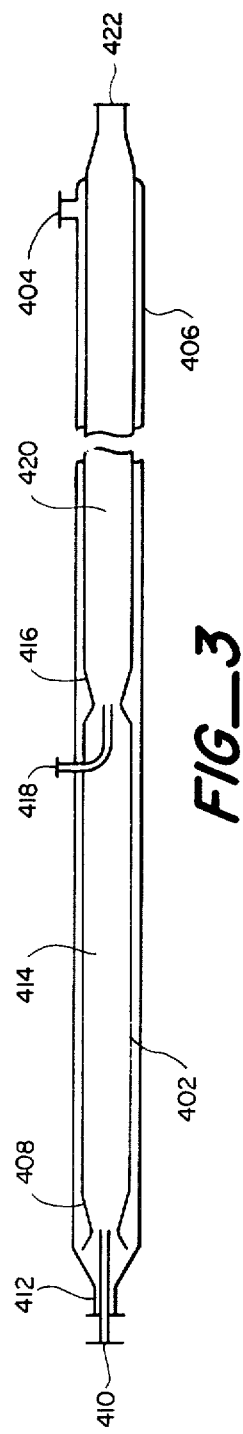
FIG_3
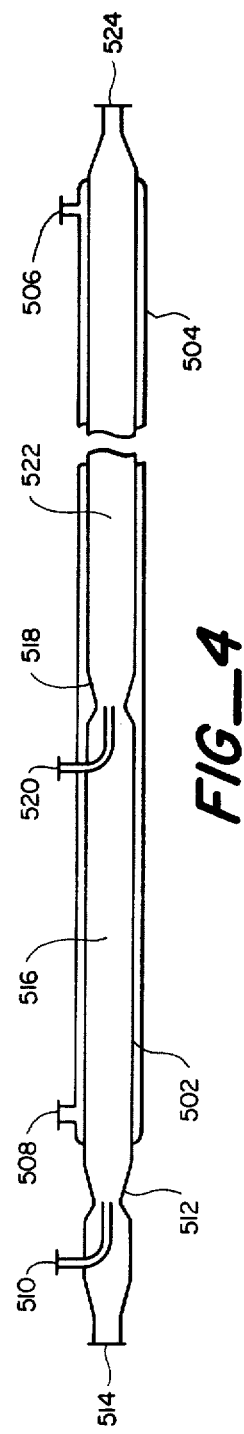
FIG_4
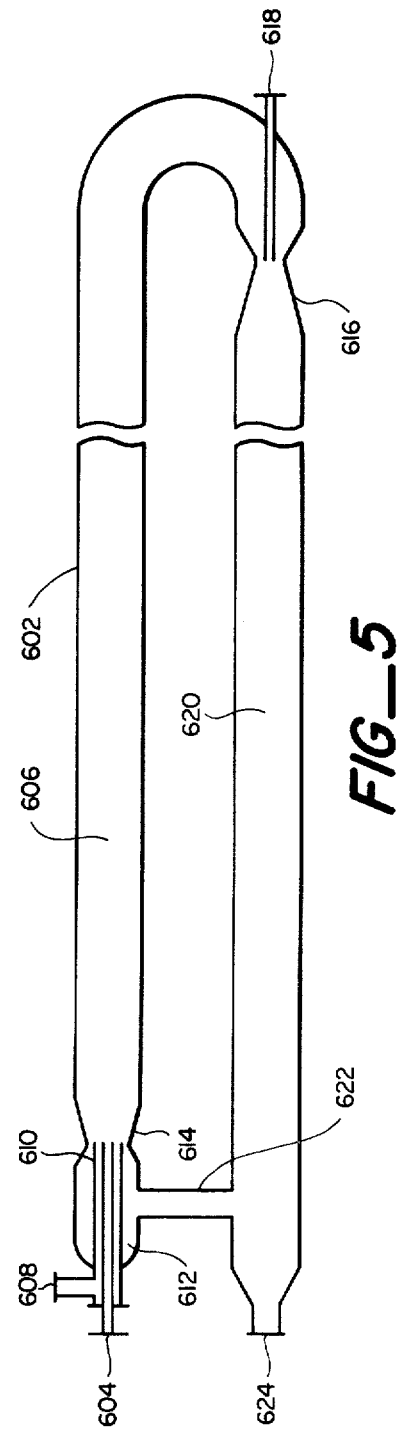
FIG_5

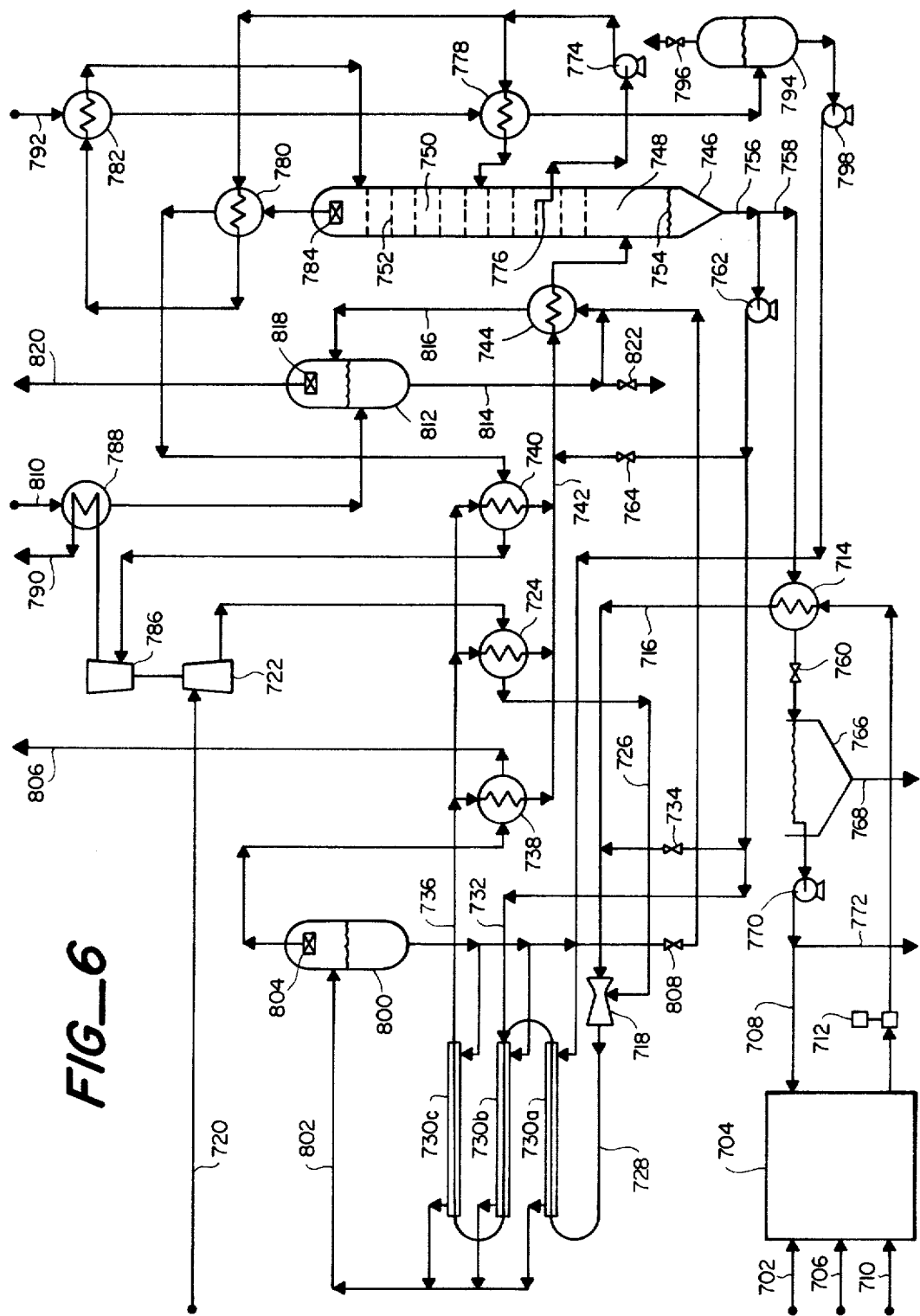
FIG_6

POLLUTION-FREE LOW TEMPERATURE SLURRY COMBUSTION PROCESS UTILIZING THE SUPER-CRITICAL STATE

CROSS-REFERENCE TO RELATED APPLICATION

This application is a continuation-in-part of application Ser. No. 948,682, filed Oct. 5, 1978 (now U.S. Pat. No. 4,292,953).

BACKGROUND OF THE INVENTION

This invention concerns the conversion of the heating values of carbonaceous fuels into useful thermal, mechanical or electrical energy.

Burning coal to generate steam is one of the oldest of the industrial arts. Numerous inventions have been applied to improving its efficiency and alleviating the co-production of noxious smoke, which tends to contain unburned fuel, finely powdered ash and oxides of sulfur and nitrogen. Nevertheless, even with the latest technology, coal is considered a dirty fuel, capable only with great difficulty and expense of complying with increasingly stringent air pollution standards. Moreover, most conventional combustion apparatuses are quite inflexible with respect to variations in fuel properties, suffering loss of availability, capacity or emissions control if required to shift from one fuel source to another.

The high cost of removing sulfur oxides from conventional flue gases has resulted in a spread between the prices of low and high sulfur coals. Moreover, the former are found, for the most part, in western states remote from areas of greatest energy need. Thus, the market price structure provides incentive for the commercialization of a process able to produce steam and power from high sulfur coals without air pollution. Other reserves of solid fuels remain largely untapped because of high contents of water or ash.

Combustion of coal in conventional ways creates temperatures of 2°-3000° F. Conventional apparatus must, therefore, be constructed of expensive materials capable of withstanding such temperatures. Components of the ash frequently melt or sinter, forming deposits which foul parts of the apparatus, causing loss of efficiency, downtime and increased maintenance expense. A further undesirable consequence of the usual temperatures is the inadvertent formation of nitrogen oxides, pollutants which cannot be effectively and economically removed from flue gas with available technology.

Generation of high pressure steam does not inherently require such high temperatures since the boiling point of water at 2000 pounds per square inch is only about 635° F. and at 3000 pounds per square inch under 700° F.

It has been proposed to burn coal by the indirect means of first converting it to liquid or gaseous fuel, which can be desulfurized before combustion to a clean flue gas. These techniques also employ high temperatures and generally share serious economic and operational drawbacks associated with coal's tendency to cake and stick when heated, the formation of soot or tarry residues and difficulties with erosion and dust control. They are further burdened with low overall thermal efficiencies.

The catalytic effect of common alkalis such as soda ash (sodium carbonate) and limestone (calcium carbonate) on the reactivity of carbonaceous materials is well known and has been utilized in the gasification of coal and coke. Alkaline compounds are used in commercial steam-hydrocarbon reforming catalysts to promote the oxidation of carbon to gaseous products. Conventional combustions do not employ alkaline catalysts because, at the high temperatures, they would volatilize and/or combine with ash ingredients to form troublesome slag or clinker.

Some of the newer fluidized bed combustion processes do, however, use beds containing limestone, or similar alkaline particles, and thus are able to burn the fuel at reduced temperature, avoiding or minimizing nitrogen oxides and slag or clinker. Generally, two categories of fluidized be combustion processes are recognized in the art: atmospheric pressure and pressurized. While both are considered to have commercial promise, the atmospheric version requires a high excess of alkali to affect even moderately high sulfur removal and both encounter difficulty in separating dust from flue gas. Although pressurized fluidized beds achieve a better alkali utilization, sulfur removal is still incomplete and dust control is even more crucial since energy must be recovered from hot flue gases by expanding them through turbines subject to erosion.

It has been known for more than 70 years that water accelerates the reactions between coal and atmospheric oxygen. Ordinary combustion processes cannot take advantage of this phenomenon because wet fuel must be dried before it will ignite. Moreover, water entering a conventional combustion, as well as the known fluidized bed combustions, leaves the system as vapor, carrying with it as an energy loss its latent heat of evaporation.

The combustion-promoting effect of water is strikingly illustrated by a family of processes known as Wet Air Oxidation (WAO), which modify or destroy organic matter suspended in water by contact with air at elevated temperature and pressure. While used mainly to purify waste water WAO, which was originally known as the Zimmerman Process, has been proposed as a means of desulfurizing coal by partial oxidation and even for recovering energy from such fuels as peat. WAO is liquid phase and therefore confined to temperatures below the critical temperature of water (705.4° F.), which limits reaction rates (requires large, expensive reactors) and the temperature at which useful heat can be delivered. WAO processes do not use alkaline catalysts.

In its capacity to modify potential fuels of hydrophilic nature, such as peat and biomass produced by aquaculture, WAO can comprise a useful pre-treatment in connection with my process. Much of the water, inseparable by ordinary methods, bound in such fuels is freed by this treatment, making it possible to charge them to my process in more concentrated form. Many hydrophilic fuels may be similarly modified by merely heating under pressure, after which excess water can be separated by mechanical or gravitational means.

Steam, flue gas, carbon dioxide, and mixtures thereof, are widely employed to enhance the recovery of residual oil from underground deposits. When steam is used alone the technique is known as steam flooding. Application of carbon dioxide is referred to as miscible flooding. Gas-steam mixtures stimulate production by pressure as well as heat. Conventionally, these recovery aids are generated by combustion of crude and refined petroleum oils. Even so, control of air and/or underground pollution is often a serious problem. There is a strong economic incentive for substituting solid fuels, which may cost only about one-third as much as petroleum, given an efficient combustion process which does not cause pollution.

SUMMARY OF THE INVENTION

Carbonaceous fuel is ground or pulverized and mixed with alkali, water and/or recycled solution to form a slurry. The slurry is pumped, preheated and charged, along with combustion air and recycled water, to a pressurized adiabatic combustion zone. While it is sometimes feasible to recycle enough water to maintain a fluid slurry phase up to the critical temperature of water, in other cases it is more economical to preheat air and/or other input streams sufficiently to vaporize slurry water at the point of mixing. In such cases combustion occurs with fuel particles entrained in a gaseous phase. Catalytic properties of water and alkali operate to permit essentially complete combustion at unusually low temperature, at which there is negligible formation of nitrogen oxides. Sulfur is oxidized to the trioxide which combines with water vapor and alkali to form alkali sulfate.

If preferred, the bulk of the ash and spent alkali may be separated in dry form from hot combustion products. As useful heat is extracted the critical temperature is passed and liquid water reappears, trapping solid particles remaining. Some of the water may be recycled to the combustion zone the remainder being used to slurry ash or fines withdrawn from the system. Hot ash or fines slurry is usually used to preheat incoming fuel slurry after which solids are separated for disposal and the aqueous solution recycled, in part, to fuel slurrying, the remainder being removed as a purge of soluble salts.

Wet flue gas separated from condensed water is further cooled and dried by scrubbing with circulating water. Heat so transferred to the water is utilized, for example, to reheat flue gas and preheat boiler feedwater. When system pressure justifies, reheated flue gas, which may be heated further by hot combustion products, is expanded through turbines which drive the air compressors. Useful heat is usually extracted from combustion products to generate and superheat steam although some may heat flue gas to such a temperature that the turbines yield a surplus of power for export.

An object of the invention is to provide a practical and economical means of obtaining heat and power from coal, and other carbonaceous fuels, without polluting the atmosphere. Another object is to make it economically possible to utilize reserves of fuels with high contents of sulfur, ash, water and other contaminants, which are poorly suited to conventional combustion methods. A further object is to permit flexibility in the choice of solid fuels. A further object is to provide a means of limiting the maximum temperature in a combustion process without loss of thermal efficiency. A further object in water-short areas is to purify low quality water. A further object is to provide from low-cost solid fuels a non-polluting source of steam, steam-flue gas or steam-carbon dioxide mixtures for Enhanced Recovery of residual oil deposits.

BRIEF DESCRIPTION OF THE DRAWINGS

FIG. 1 is a schematic elevational diagram illustrating an embodiment of the process of the invention in which energy is delivered in the form of superheated steam.

FIG. 2 is a schematic elevational diagram of an embodiment illustrating staged fuel slurry injection, dry ash production, delivery of product energy as electric power and purification of extraneous water.

FIG. 3 is a schematic diagram of a jacketed combustion reactor in which air is preheated by indirect exchange with reactants.

FIG. 4 is a schematic diagram of a jacketed reactor in which fuel slurry is preheated by indirect exchange with reactants.

FIG. 5 is a schematic diagram of a reactor in which hot combustion products are recirculated to the inlet zone.

FIG. 6 is a schematic elevational diagram of a reduced pressure embodiment in which a substantial part of the combustion heat is extracted through reactor heat transfer surface.

DESCRIPTION OF PREFERRED EMBODIMENTS

With reference to FIG. 1, solid fuel from a suitable source is supplied through a conduit 2 to a conventional grinding and slurrying system 4 in which it is mixed with water coming from a suitable storage facility through a line 6 and recycled solution entering by means of a line 8. Powdered, granular, dissolved or slurried alkali is added to the mixture via a conduit 10. A fuel slurry charge pump 12 draws the resulting slurry from the system 4 and provides sufficient pressure to cause it to flow through a slurry preheat exchanger 14 and then to a mixer 16 in which the water in the preheated slurry is vaporized by mixing with a hot air-steam mixture from a line 18. Fuel and alkali particles entrained in the air-steam mixture flow from the mixer 16 to a tubular reactor 20 in which combustion takes place. At a point, or points, part way through the reactor 20 the partially combusted mixture is joined by recycled ash slurry from a line 22. Water in the ash slurry is also vaporized immediately upon being mixed with the hot fluid. A section of the reactor toward the outlet end is jacketed to form a double-pipe heat exchanger 24.

Atmospheric air is filtered in a conventional manner (not shown) to protect the equipment from airborne solids and conducted via a conduit 26 to the suction of a first-stage air compressor 28, which delivers it hot and at an elevated pressure to a first-stage intercooler, arranged in three sections, 30, 32 and 34. Cooling medium for the intercooler sections is boiler feedwater which flows first through the third section, then the second section and finally the first section, counter-current to the flow of compressed air.

Atmospheric air contains a variable amount of water vapor (humidity). Most of the water vapor contained in the air drawn into the apparatus condenses to liquid water during the final cooling in the third section of first stage intercooler 34. This water is separated from the compressed air in a second-stage air compressor suction drum 36 and a mist extractor 38 and is discharged from the apparatus through a control valve 40.

The dried first-stage compressed air flows from the mist extractor 38 to the suction of a second-stage air compressor 42 which delivers it hot and at a further increased pressure to a second-stage intercooler, also arranged in three sections, 44, 46 and 48. The second-stage intercooler sections 44, 46 and 48 operate in parallel with the first-stage intercooler sections 30, 32 and 34 with respect to the feedwater cooling medium. A small amount of liquid water condenses also in the third section 48 of the second-stage intercooler and is separated from the compressed air in a third-stage air compressor suction drum 50 and a mist extractor 52 and is discharged from the apparatus through a control valve 54.

The dried second-stage compressed air flows from the mist extractor 52 to the suction of a third-stage compressor 56 which delivers it hot and at a pressure somewhat above reaction pressure to an air preheat exchanger 58 in which it is further heated by indirect exchange with combustion products. Preheated compressed air then joins with steam in the line 18 before mixing with fuel slurry.

Hot combustion products leaving the reactor 20, after preheating air in the preheater 58, flow to a steam superheater 60 in which they give up part of their sensible heat in indirect heat exchange with product steam. Arriving essentially saturated, steam leaves the superheater 60 at a temperature suitable for the intended use.

From the superheater 60 combustion products flow through a line 62 to a first-stage flue gas reheat exchanger 64, a second-stage flue gas reheat exchanger 66 and a third-stage flue gas reheat exchanger 68, arranged in parallel with respect to combustion products. For clarity of illustration the exchangers 64, 66 and 68 are also shown in their position in the flue gas expansion train. The designations 62a, 62b and 62c refer to the entering parallel streams of combustion products into which the line 62 is divided and, similarly, the designations 70a, 70b and 70c refer to parallel streams of partially cooled combustion products leaving the reheat exchangers to recombine in a line 70. (One or both of the exchangers 58 and 60 may also be arranged in parallel with the exchangers 64, 66 and 68, instead of in series as shown.)

Partially cooled combustion products in the line 70 flow to a boiler 72 in which more of their sensible heat, and the latent heat of part of their water vapor content, are transferred to boiling feedwater. Gases in the combustion products remaining uncondensed after passing through the boiler 72, to which I shall refer as wet flue gas, together with the condensed water and ash and spent alkali particles, flow to flue gas dehydrator 74, a cylindrical vessel containing an open separating zone 76 in its lower section and a rectification zone 78, comprising a series of vapor-liquid contacting elements, such as bubble or perforated trays, in its upper section.

In the separating zone 76 gravity causes the water, containing ash and spent alkali particles, to separate and collect in the bottom forming, along with water flowing downward from the lowest contacting element, an ash slurry level 80. An ash slurry recycle pump 82 takes suction from the bottom of the dehydrator 74 furnishing recycled ash slurry to the reactor 20 via the line 22 as required to maintain the temperature pattern desired during the combustion. The ash slurry level 80 is held within the proper operating range by withdrawing the net ash slurry production through a line 84 and the preheat exchanger 14 under control of a let-down valve 86. In the heat exchanger 14 indirect transfer of heat from the hot ash slurry to the cold fuel slurry cools the ash slurry below its atmospheric boiling point.

Cooled and depressured ash slurry then enters a settler 88 in which gravity causes the solid ash and spent alkali particles to concentrate in a conical bottom section from which they are withdrawn from the apparatus for disposal through a line 90. The liquid portion in the upper part of the ash settler 88, from which most of the solids have been separated, flows to a solution pump 92 which causes it to flow to a point of division between a portion which is purged from the apparatus via a line 94 and a portion, known as external recycle, which is recycled through the line 8 to the grinding and slurrying system 4.

Referring again to the flue gas dehydrator 74, wet flue gas separated from ash slurry in the separating zone 76 flows upward through the rectification zone 78 in counter-current contact with a descending cascade of cooled water circulated by a circulating reflux pump 96. This multi-stage contacting cools the flue gas and condenses from it most of the water vapor it contained when separated from ash slurry. Part of the condensed water flows, with the aid of the pump 96, to the outer pipes of the double-pipe heat exchanger section 24 of the reactor 20, in which indirect transfer of heat from the reacting mixture in the inner pipes vaporizes and superheats it as required to obtain an air-steam mixture in the line 18 capable of vaporizing the fuel slurry.

The remainder of the water condensed from wet flue gas flows downward over the lower trays of the rectification zone 78, washing the rising vapors free of entrainment. It then joins the ash slurry in the bottom of the dehydrator 74. A small amount may, however, be diverted through a connection controlled by a valve 97 to the hot side inlet of the boiler 72, to wash through any mud-like deposits which might otherwise occur in the vicinity of the dewpoint.

The pump 96 takes suction from a sump located in the lower part of the rectification zone 78, a few trays above the lowermost contacting element, and delivers hot water, approaching in temperature the wet flue gas rising from the separating zone 76, to a circulating reflux-boiler feedwater exchanger 98. The pumped reflux is also supplied as heating medium to a first-stage circulating reflux-flue gas exchanger 100, a second-stage circulating reflux-flue gas exchanger 102 and a third-stage circulating reflux-flue gas exchanger 104.

Indirect transfer of heat to partially expanded flue gas in the exchangers 102 and 104 cools that portion of the circulating reflux to a temperature suitable to be returned through a line 106 to the top tray of the rectification zone 78. Indirect transfer of heat to unexpanded flue gas in the exchanger 100 cools another portion of circulating reflux to a temperature suitable to be returned to a tray in the upper part of the rectification zone 78. Indirect transfer of heat to boiler feedwater in the exchanger 98 cools a third portion of circulating reflux to a temperature suitable to be returned to an intermediate point in the rectification zone 78.

Cooled and dehydrated flue gas leaving the top of the rectification zone 78 passes through a mist extractor 112 to free it of entrained water droplets and is then reheated, successively, in the first-stage circulating reflux-flue gas exchanger 100 and the first-stage flue gas reheat exchanger 64. The reheated flue gas is then expanded through a first-stage flue gas turbine 114 which delivers mechanical energy, in the form of shaft horsepower, to the third-stage air compressor 56.

Having been cooled by giving up energy in the turbine 114 the partially expanded flue gas is reheated, succesively, in the second-stage circulating reflux-flue gas exchanger 102 and the second-stage flue gas reheat exchanger 66. Reheated flue gas leaving the exchanger 66 is then expanded a second time through a second-stage flue gas turbine 116 which delivers mechanical energy to the second-stage air compressor 42.

Having been again cooled by giving up energy in the turbine 116 the flue gas, now at a further reduced pressure level, is reheated, successively, in the third-stage circulating reflux-flue gas exchanger 104 and the third-stage flue gas reheat exchanger 68. Reheated flue gas leaving the exchanger 68 is then expanded a third time through a third-stage flue gas turbine 118 which delivers mechanical energy to the first-stage air compressor 28.

The expanded flue gas, partially cooled by having given up energy in the turbine 118 and now at a pressure only slightly above atmospheric, flows through an economizer exchanger 120 in which it is further cooled by boiler feedwater before being released through a suitable vent 122 to the atmosphere.

A low pressure boiler feedwater pump 124 takes suction from a source external to the apparatus and delivers feedwater via a line 126 to the third section 34 of the first-stage intercooler and to the third section 48 of the second-stage intercooler. Extracting heat from compressed air in these exchangers warms the parallel feedwater streams which recombine in a header 128. The feedwater then divides into three streams: one flowing to the second section 32 of the first-stage intercooler, one to the second section 46 of the second-stage intercooler, and one to the economizer exchanger 120. Transfer of heat from compressed air and flue gas, respectively, in these exchangers further increases the temperature of the feedwater streams, which recombine in a header 130 to divide again between the first section 30 of the first-stage intercooler and the first section 44 of the second-stage intercooler. Transfer of heat from compressed air in these intercooler sections further increases the temperature of the feedwater streams which recombine again in a header 132 to flow to a boiler feedwater accumulator 134.

The accumulator 134 which may, in practice, be a so-called feedwater de-aerator of proprietary design, permits the separation of any gases liberated by the heating of the feedwater, allowing them to be vented through a valve 136. From the accumulator 134 feedwater flows to the suction of a high pressure boiler feedwater pump 138. The pump 138 delivers the de-aerated feedwater under sufficient pressure to cause it to flow through the circulating reflux-boiler feedwater exchanger 98, in which it receives its final preheating, to the cold side inlet of the boiler 72.

The preheated boiler feedwater joins with recirculated feedwater from a line 140, the combined stream flowing to the boiler 72 in which heat transferred from combustion products converts part of the water to steam. A two-phase water-steam mixture flows via a line 142 to a steam drum 144. The difference in density between the water in the line 140 and the water-steam mixture in the line 142 sets up a hydraulic driving force which causes water to circulate from the bottom of the drum 144 through the boiler 72 and back to the drum 144.

In the drum 144 steam separates from water and leaves through a mist extractor 148, which purifies it of entrained droplets on its way to the steam superheat exchanger 60 in which, as previously described, it is superheated by transfer of heat from combustion products before leaving the apparatus via a line 150 as the main product of the process.

Dissolved solids brought into the apparatus with the cold feedwater tend to accumulate in the water in the steam drum 144 and have to be purged from the steam system. A blowdown pump 146 provides the pressure necessary to transfer a small purge stream from the steam drum 144 to the ash slurry recycle stream as a result of which feedwater solids are eventually removed from the apparatus along with product ash.

With reference to FIG. 2, solid fuel from a suitable source is supplied through a conduit 202 to a conventional grinding and slurrying system 204 in which it is mixed with water coming from a suitable storage facility through a line 206 and recycled solution entering by means of a line 208. Powdered, dissolved or slurried alkali is added to the mixture via a conduit 210. A fuel slurry charge pump 212 draws the resulting slurry from the system 204 and provides sufficient pressure to cause it to flow through a slurry preheat exchanger 214 and via a line 216 to a combustion reactor 224. Prior to entering the reactor 244 the preheated slurry in the line 216 divides into three roughly equal streams indicated by lines 218, 220 and 222.

Atmospheric air is filtered in a conventional manner (not shown) to protect the equipment from airborne solids and conducted via a conduit 226 to the suction of a first-stage air compressor 228 which delivers it hot and at an elevated pressure to a first-stage intercooler, arranged in three sections 230, 232 and 234. Cooling medium for the intercooler sections is boiler feedwater which flows first through the third section 234, then the second section 232 and finally the first section 230, counter-current to the flow of compressed air.

Atmospheric air contains a variable amount of water vapor (humidity). Most of the water vapor contained in the air drawn into the apparatus condenses to liquid water during the final cooling in the third section 234 of the first-stage intercooler. This water is separated from the compressed air in a second-stage compressor suction drum 236 and a mist extractor 238 and is discharged form the apparatus through a control valve 240.

The dried first-stage compressed air flows from the mist extractor 238 to the suction of a second-stage air compressor 242 which delivers it hot and at a further increased pressure to a second-stage intercooler, also arranged in three sections, 244, 246 and 248. The second-stage intercooler sections 244, 246 and 248 operate in parallel with the first-stage intercooler sections 230, 232 and 234 with respect to the feedwater cooling medium. A small amount of liquid water condenses also in the third section 248 of the second-stage intercooler and is separated from the compressed air in a third-stage air compressor suction drum 250 and a mist extractor 252 and is discharged from the apparatus through a control valve 254.

The dried second-stage compressed air flows from the mist extractor 252 to the suction of a third-stage air compressor 256 which delivers it hot and at a pressure somewhat above reaction pressure to an air preheat exchanger 258 in which it is further heated by indirect exchange with cleaned combustion products. Preheated compressed air then flows to the inlet of the reactor 224.

The portion of fuel slurry conveyed by the line 218 is also injected into the inlet zone of the reactor 224, this part of the apparatus being designed to enhance its mixing with the preheated air. Heat in the air serves to vaporize the fuel slurry water so that combustion proceeds as fuel and alkali particles are entrained in a flowing air-steam mixture. Heat of combustion increases the temperature of this fluid as it moves through the reactor.

At a point at which the temperature of the flowing fluid has reached a satisfactory level, at least sufficient to vaporize a second portion of slurry water, the portion of preheated fuel slurry conveyed by the line 220 is injected. Although heat absorbed in vaporizing slurry water causes a brief dip in fluid temperature, liberation of combustion heat starts it increasing again as the fluid continues to flow through the reactor 224.

At a point at which the temperature of the flowing fluid has again reached a satisfactory level, at least sufficient to vaporize a third portion of slurry water, the portion of preheated fuel slurry conveyed by the line 222 is injected. Again, latent heat of vaporizing water causes a brief dip in fluid temperature but heat of combustion quickly starts it increasing.

A fines slurry recycle pump 260 delivers hot recycle water (internal recycle) containing a light loading of fine ash and spent alkali particles (fines) to intermediate sections of the reactor 224 to control the maximum combustion temperature within predetermined limits. A portion of the internal recycle may join the fuel slurry in the line 222 via a valve 262. Other portions are injected into the fluid flowing through the reactor 224 at appropriate intervals as illustrated by the connections 264 and 266.

Hot combustion products flow from the reactor 224 to a cyclone separator 268 in which centrifugal forces cause the greater part of unburned fuel (ash) and spent alkali particles to separate and fall by gravity through a dipleg 270 into an ash accumulator 272. In the accumulator 272 some of the gases accompanying the solid particles through the dipleg 270 disengage as the solids settle and become more compacted. The disengaged gases flow through a line 274 to rejoin the cleaned combustion products leaving the cyclone separator 268 via a line 276.

Settled ash and spent alkali particles may be discharged from the accumulator 272 through a powdered solids flow control device 278, either continuously or intermittently, and from the apparatus through known means for withdrawing finely divided solids from pressurized systems, such as lock hoppers.

Hot cleaned combustion products in the line 276, still containing a light loading of fine dust (fines) are first used as heating media to indirectly reheat flue gas, preheat air and superheat steam in, respectively, a multi-stream flue gas reheat exchanger 280, the air preheat exchanger 258 and a steam superheat exchanger 282. The multi-stream exchanger 280 reheats flue gas prior to each of four stages of expansion, in parallel passages denoted 280a, 280b, 280c and 280d. The flow of combustion products through the multi-stream exchanger 280 is directed by baffles (not shown) so that each passage is equivalent to an individual counter-current combustion products-flue gas heat exchanger in parallel with the other three. The air preheater 258 and the steam superheater 282 are also in parallel with the flue gas passages of the multi-stream exchanger with respect to combustion products.

Partially cooled combustion products from the exchangers 280, 258 and 282 are recombined in a manifold 284 which conveys them to a boiler 286 in which more of their sensible heat, and the latent heat of part of their water vapor content, are transferred to boiling feedwater. Gases remaining uncondensed after passing through the boiler 286, to which I shall refer as wet flue gas, together with the condensed water and fines, flow to a flue gas dehydrator 288, a cylindrical vessel containing an open separating zone 290 in its lower section and a rectification zone 292, comprising a series of vapor-liquid contacting elements, such as bubble or perforated trays, in its upper section.

In the separating zone 290 gravity causes the water carrying the fines to separate and collect in the bottom forming, along with water flowing downward from the lowest contacting element, a fines slurry level 294. This level is held within the proper operating range by withdrawing the net fines slurry production through lines 296 and 298, and the slurry preheat exchanger 214, under control of a let-down valve 300. The fines slurry recycle pump 260, previously referred to, also takes suction from the lower part of the flue gas dehydrator 288 through the line 296.

Cooled and depressured fines slurry enters a fines settler 302 in which gravity causes the fines particles to concentrate in a conical bottom section from which they are withdrawn from the apparatus for disposal through a line 304. The aqueous liquid in the upper part of the settler 302, from which most of the solids have been separated, flows to a solution pump 306 which causes it to flow to a point of division between a portion which is purged from the apparatus via a line 308 and a portion, known as external recycle, which is recycled through the line 208 to the grinding and slurrying system 204.

Referring again to the flue gas dehydrator 288, wet flue gas separated from fines slurry in the separating zone 290 flows upward through the rectification zone 292, in counter-current contact with a descending cascade of cooled water circulated by a circulating reflux pump 310. This multi-stage contacting cools the flue gas and condenses from it most of the water vapor it contained when separated from fines slurry. A portion of the condensed water may flow, with the aid of the circulating reflux pump 310, either continuously or intermittently, through a valve 312 to the hot side of the boiler 286, to wash through any mud-like deposits which might otherwise form in the vicinity of the dewpoint. The remainder of the condensed water flows downward over the lower trays of the rectification zone 292, washing the rising wet flue gas free of entrainment. It then joins the fines slurry in the bottom of the dehydrator 288.

The pump 310 takes suction from a sump located in the lower part of the rectification zone 292, a few trays above the lowermost contacting element, and delivers hot water, approaching in temperature the wet flue gas rising from the separating zone 290, to a circulating reflux-boiler feedwater exchanger 314, a first-stage circulating reflux-flue gas exchanger 316 and a multi-stream circulating reflux-flue gas exchanger 318. In the exchanger 316 the hot circulating reflux reheats unexpanded flue gas and in the multi-stream exchanger 318 it reheats flue gas after each of its first three stages of expansion in passages denoted, respectively, 318b, 318c and 318d. The flow of circulating reflux through the multi-stream exchanger 318 is directed by baffles (not shown) so that each passage is equivalent to an individual counter-current circulating reflux-flue gas exchanger in parallel with the other two. The exchangers 314 and 316 are also in parallel with the flue gas passages of the multi-stream exchanger 318 with respect to the circulating reflux.

Indirect transfer of heat to partially expanded flue gas in the parallel passages 318b, c, and d cools that portion of the circulating reflux to a temperature suitable for returning, through a line 320, to the top tray of the rectification zone 292. However, additional cooling may be supplied to the reflux in the line 320 by a primary circulating reflux-boiler feedwater exchanger (not shown). Indirect transfer of heat to unexpanded flue gas in the exchanger 316 cools that portion of the circulating reflux to a temperature suitable for returning through a line 322 to a tray in the upper part of the rectification zone 292. Indirect transfer of heat to boiler feedwater in the exchanger 314 cools that portion of the circulating reflux to a temperature suitable for returning through a line 324 to an intermediate point in the rectification zone 292.

Cooled and dehydrated flue gas leaving the top of the rectification zone 292 passes through a mist extractor 326 to free it of entrained water droplets and is then reheated, successively, in the first-stage circulating reflux-flue gas exchanger 316 and the passage 280a of the multi-stream exchanger 280. The hot flue gas is then expanded through a first-stage flue gas turbine 328, which delivers mechanical energy, in the form of shaft horsepower, to an electric generator (or alternator) 330. Electrical energy flows from the generator 330 and from the apparatus through a conduit 332 as a product of the process.

Having been cooled by giving up energy in the turbine 328, the partially expanded flue gas is reheated, successively, by circulating reflux in the passage 318b of the multi-stream exchanger 318 and by combustion products in the passage 280b of the multi-stream exchanger 280. The hot flue gas is then expanded a second time through a second-stage flue gas turbine 334, which delivers mechanical energy, in the form of shaft horsepower, to the third-stage air compressor 256.

Having been cooled by giving up energy in the turbine 334, the further expanded flue gas is reheated, successively, by circulating reflux in the passage 318c of the multi-stream exchanger 318 and by combustion products in the passage 280c of the multi-stream exchanger 280. The hot flue gas is then expanded a third time through a third-stage flue gas turbine 336, which delivers mechanical energy, in the form of shaft horsepower, to the second-stage air compressor 242.

Having been cooled by giving up energy in the turbine 336, the further expanded flue gas is reheated, successively, by circulating reflux in the passage 318d of the multi-stream exchanger 318 and by combustion products in the passage 280d of the multi-stream exchanger 280. The hot flue gas is then expanded a fourth time through a fourth-stage flue gas turbine 338, which delivers mechanical energy, in the form of shaft horsepower, to the first-stage air compressor 228.

Having been partially cooled by giving up energy in the turbine 338, the fully expanded flue gas, now at a pressure only slightly above atmospheric, flows through an economizer exchanger 340, in which it is further cooled by boiler feedwater, before being released to the atmosphere through a suitable vent 341.

A low pressure boiler feedwater pump 342 takes suction from a source external to the apparatus and delivers feedwater via a line 344 to the third section 234 of the first-stage intercooler and to the third section 248 of the second-stage intercooler. Extracting heat from compressed air in these exchangers warms the parallel feedwater streams which recombine in a header 346. The feedwater then divides into three streams: one flowing to the second section 232 of the first-stage intercooler, one to the second section 246 of the second-stage intercooler, and one to the economizer 340. Transfer of heat from compressed air and flue gas, respectively, in these exchangers further increases the temperature of the feedwater streams which recombine in a header 348 to divide again between the first section 230 of the first-stage intercooler and the first section 244 of the second-stage intercooler. Transfer of heat from compressed air in these intercooler sections further increases the temperatures of the feedwater streams which recombine in a header 350 to flow to a boiler feedwater accumulator 352.

The accumulator 352 which may, in practice, be a so-called feedwater de-aerator of proprietary design, permits the separation of any gases liberated by the heating of the feedwater, allowing them to be vented through a valve 354. From the accumulator 352 feedwater flows to the suction of a high pressure boiler feedwater pump 356. The pump 356 delivers the de-aerated feedwater under sufficient pressure to cause it to flow through the circulating reflux-boiler feedwater exchanger 314, in which it receives its final preheat, to the cold side inlet of the boiler 286.

The preheated boiler feedwater joins with recirculated feedwater from a line 358, the combined stream flowing to the boiler 286 in which heat transferred from combustion products converts part of the water to steam. A two-phase water-steam mixture flows via a line 360 to a steam drum 362. The difference in density between water in the line 358 and the water-steam mixture in the line 360 sets up a hydraulic driving force which causes water to circulate from the bottom of the drum 362 through the boiler 286 and back to the drum 362.

In the drum 362 steam separates from water and leaves through a mist extractor 366, which purifies it of entrained droplets on its way to the steam superheat exchanger 282 in which, as previously described, it is superheated by transfer of heat from combustion products before leaving the apparatus via a line 368 as the main product of the process.

Dissolved solids brought into the apparatus with the cold feedwater tend to accumulate in the water in the steam drum 362 and have to be purged from the steam system. A blowdown pump 364 provides the pressure necessary to transfer a small purge stream from the steam drum 362 to the fines slurry recycle stream as a result of which feedwater solids are eventually removed from the apparatus along with fines of ash and spent alkali.

In case it is desired to take advantage of the inherent water purification capabilities of the process, impure water may be introduced into the apparatus of FIG. 2 in one of several places, such as into the fuel grinding and slurrying system 204 through the line 206 and/or into the suction of the fines slurry recycle pump 260 through a valve 259. A more-or-less equal amount of purified water may then be drawn from the circulating reflux system as, for example, through a valve 321 and/or a valve 309. A heat exchanger (not shown) would usually be employed to transfer heat from outgoing purified water to incoming impure water.

With reference to FIG. 3, combustion air is preheated by indirect exchange with reactants in a tubular reactor 402. The air enters through an air inlet 404 into an annular space inside a jacket 406 surrounding and concentric with the reactor 402, which may be finned to increase the heat transfer surface exposed to the air. Air flow through the annulus is counter-current to the direction of reactant flow inside the reactor 402. Having been heated by contact with the hot reactor surface the air, upon reaching the end opposite the inlet 404, reverses direction and enters the reactor 402 through a primary venturi 408.

A fuel slurry nozzle 410, positioned at the centerline of the reactor 402, extends through a closure device 412 to the throat of the venturi 408. Fuel slurry is injected through the nozzle 410 and mixes with the preheated air under turbulent flow conditions in the outlet cone of the venturi 408. In a primary combustion zone 414 particles of fuel burn, increasing the temperature of the flowing mixture. In the downstream part of the zone 414 the temperature becomes high enough to cause heat to flow to the wall of the reactor 402, and from the wall to the air outside the wall.

After traversing the primary combustion zone 414 the heated mixture enters a recycle venturi 416. A recycle nozzle 418 passes through the jacket 406 and the reactor 402, curving so that its open end terminates at the centerline of the throat of the venturi 416. Recycle water or ash or fines slurry is injected through the nozzle 418, mixing with primary combustion zone effluent under turbulent conditions in the outlet cone of the venturi 416. Vaporization of recycle water causes a drop in temperature as this mixing occurs and the mixture enters a secondary combustion zone 420. However, continuing combustion of fuel particles causes it to rise again until it reaches a level such that heat again flows to the wall of the reactor 402 and to the air outside the wall.

During passage through the secondary combustion zone 420 combustion is essentially completed. Hot combustion products leave the zone 420 and the reactor 402 by means of an outlet connection 422.

FIG. 3 illustrates an embodiment in which all of the fuel slurry is mixed with the air in a primary venturi. It is also contemplated that the fuel slurry for an air-jacketed reactor, similar to that of FIG. 3, may be divided into two or more portions as in the embodiment of FIG. 2. In such case there would be a plurality of injection nozzles, venturis and combustion zones equivalent to the recycle nozzle 418, secondary venturi 416 and secondary combustion zone 420 of FIG. 3.

With reference to FIG. 4, fuel slurry passing through an annular space between a tubular reactor 502 and an outer jacket 504 is preheated by indirect exchange with reactants inside the reactor 502. Fuel slurry enters the annular space by means of a fuel slurry inlet 506, positioned near the outlet end of the reactor 502, and flows through the annulus, counter-current to the direction of flow inside the reactor 502, to a preheated fuel slurry outlet 508. Heat transfer from the reactants raises the temperature of the fuel slurry which then flows via an external connection (not shown) to a fuel slurry nozzle 510. The nozzle 510 is positioned so that its open end terminates in the throat of a primary venturi 512.

Combustion air is supplied to the inlet cone of the venturi 512 through an air inlet 514. Preheated fuel slurry and air mix under turbulent conditions in the outlet cone of the venturi 512. In a primary combustion zone 516 particles of fuel burn, increasing the temperature of the flowing mixture. In the downstream part of the zone 516 the temperature becomes high enough to cause heat to flow to the wall of the reactor 502 and from the wall to the slurry outside the wall.

After traversing the primary combustion zone 516 the heated mixture enters a recycle venturi 518. A recycle nozzle 520 passes through the jacket 504 and the reactor 502, curving so that its open end terminates at the centerline of the throat of the venturi 518. Recycle water or ash or fines slurry is injected through the nozzle 520, mixing with primary zone effluent under turbulent conditions in the outlet cone of the venturi 518. Vaporization of water causes a drop in temperature as this mixing occurs and the mixture enters a secondary combustion zone 522. However, continuing combustion of fuel particles causes it to rise again until it reaches a level such that heat again flows to the wall of the reactor 502 and to the slurry outside the wall.

During passage through the secondary combustion zone 522 combustion is essentially completed. Hot combustion products leave the zone 522 and the reactor 502 by means of an outlet connection 524.

FIG. 4 illustrates an embodiment in which all of the fuel slurry is mixed with the air in a primary venturi. It is also contemplated that fuel slurry preheated in a reactor jacket, similar to that of FIG. 4, may be divided into two or more portions as in the embodiment of FIG. 2. In such cases there would be a plurality of injection nozzles, venturis and combustion zones equivalent to the recycle nozzle 520, secondary venturi 518 and secondary combustion zone 522 of FIG. 4.

The provision of an external connection between the preheated fuel slurry outlet 508 and the fuel slurry nozzle 510 is convenient when the fuel slurry is to be injected through more than one nozzle because regulation devices accessible to the operators may be installed to adjust the proportions allotted to different nozzles, in accordance with fuel reactivity, reactor temperature profile, etc. However, when only a single fuel slurry nozzle is to be used, the connection between annulus and nozzle may be internal.

Reactors essentially similar to the embodiment of FIG. 4 may also be used to transfer reaction heat to a heat transfer fluid as a product of the process.

With reference to FIG. 5, a recirculating combustion reactor 602 has a fuel slurry nozzle 604 concentric with the centerline of a primary combustion zone 606. An air inlet 608 leads to an air nozzle 610 which surrounds and is concentric with the fuel nozzle 604. Both the nozzle 604 and the nozzle 610 extend through a recycle chamber 612 to the throat of an eductor 614. The eductor 614 is so designed that the kinetic energies of fuel slurry discharged from the nozzle 604 and air discharged from the nozzle 610 create a zone of lowered pressure such that hot combustion products in the recycle chamber 612 are drawn into the throat. Recycled combustion products, fuel slurry and air mix under turbulent conditions in the outlet cone of the eductor 614 and flow into the primary combustion zone 606.

While traversing the zone 606 particles of fuel burn, raising the temperature of the flowing mixture. Leaving the zone 606 the hot mixture reverses direction and enters a venturi 616. A recycle nozzle 618 passes through the wall of the reactor 602, terminating in the throat of the venturi 616. Recycle water or ash or fines slurry is injected through the nozzle 618, mixing with primary combustion zone effluent under turbulent conditions in the outlet cone of the venturi 616. Vaporization of recycle water causes a drop in temperature as this mixing occurs and the mixture enters a secondary combustion zone 620. However, continuing combustion of fuel particles causes the temperature to rise again as the mixture flows through the zone 620.

Near the downstream end of the zone 620, with combustion essentially complete, the combustion products stream divides, a recycle portion flowing through a recycle crossover 622 to the recycle chamber 612. The crossover 622 may contain a flow regulating device (not shown) so that discretionary control may be exercised over the rate of combustion products recycle. Net production of combustion products leaves the secondary combustion zone 620 and the reactor 602 through a combustion products outlet 624.

Since a primary purpose of the eductor 614 is to create a pressure differential such that hot combustion products are caused to recirculate to the primary combustion zone 606, it is not necessary that both air and fuel slurry be injected into its throat. In some cases, kinetic energy of the air alone is sufficient to induce adequate recirculation, fuel slurry being subsequently injected into the air-combustion products mixture.

While the embodiment of FIG. 5 illustrates a U-tube configuration, the combustion products recycle concept may also be applied to a concentric tube configuration, generally similar to the embodiment of FIG. 3, except that the annulus would comprise the secondary combustion zone rather than an air passage. Also, hot combustion products may be recycled from an outlet zone to an inlet zone of reactors of various other configurations by means of external piping connections.

With reference to FIG. 6, solid fuel from a suitable source is supplied through a conduit 702 to a conventional grinding and slurrying system 704 in which it is mixed with water coming from a suitable storage facility through a line 706 and recycled solution entering by means of a line 708. Powdered, dissolved or slurried alkali may be added to the mixture via a conduit 710. A fuel slurry charge pump 712 draws the resulting slurry from the system 704 and provides sufficient pressure to cause it to flow through a slurry preheat exchanger 714 and via a line 716 a fuel-air mixer 718.

Atmospheric air is filtered in a conventional manner (not shown) to protect the equipment from airborne solids and conducted via a conduit 720 to the suction of an air compressor 722. The compressor 722, which may consist of more than one stage with conventional intercoolers between stages, delivers it at elevated pressure and temperature to an air preheat exchanger 724 in which it is further heated by indirect exchange with hot combustion products. Preheated compressed air then flows through a line 726 to the fuel-air mixer 718.

In the mixer 718 sensible heat of the preheated air causes the water in the preheated fuel slurry to vaporize so that fuel particles flow to a tubular reactor 728 entrained in a gaseous mixture of air and water vapor. Downstream sections of the reactor 728 are equipped with heat transfer surface, the form illustrated comprising concentric pipes 730a, 730b and 730c surrounding portions of the reactor wall. The amount of reactor heat transfer surface is such that a substantial part of the combustion heat liberated in the reactor 728 can be transferred to feedwater boiling in the annular spaces between the reactor and the concentric pipes 730a, 730b and 730c.

As the mixture of air, water vapor and fuel particles moves through the reactor 728 the fuel particles burn while oxygen is replaced by carbon dioxide and additional water vapor. Although the heat of combustion causes the temperature of the mixture to rise, the increase is moderated by the aforementioned heat transfer. Maximum combustion temperature may be further limited by the injection of recycled ash slurry, the water in which absorbs heat by changing from liquid to vapor phase, at one or more points through connections illustrated by a line 732. The fuel slurry in the line 716 may be diluted by addition of recycled ash slurry through a connection regulated by a valve 734. Besides aiding the control of combustion temperatures, the recycled slurry (internal recycle) increases the partial pressure of water vapor, favorably influencing the oxidation of carbon and sulfur in the fuel.

Hot combustion products leave the reactor through a line 736, flowing to a steam superheat exchanger 738, the air preheat exchanger 724 and a flue gas reheat exchanger 740, in which they serve as heating medium for, respectively, saturated high pressure steam, compressed air and unexpanded flue gas.

Partially cooled combustion products from the exchangers 738, 724 and 740 recombine in a manifold 742 which conveys them to a boiler 744 in which more of their sensible heat, and the latent heat of part of their water vapor content, are transferred to boiling low pressure feedwater. Gases remaining uncondensed after passing through the boiler 744, to which I shall refer as wet flue gas, together with condensed water and ash particles, flow to a flue gas dehydrator 746, a cylindrical vessel containing an open separating zone 748 in its lower section and a rectification zone 750, comprising a series of vapor-liquid contacting elements 752, such as bubble or perforated trays, in its upper section.

In the separating zone 748 gravity causes the water carrying the ash particles to separate and collect in the bottom forming, along with water flowing downward from the lowest of the contacting elements 752, an ash slurry level 754. This level is held within the proper operating range by withdrawing the net production of ash slurry through lines 756 and 758 and the slurry preheat exchanger 714, under control of a let-down valve 760. An ash slurry recycle pump 762 also takes suction from the bottom of the flue gas dehydrator 746 through the line 756, delivering recycled ash slurry to the reactor 728 through the connection 732 and, optionally, to the preheated fuel slurry through the valve 734. A further optional connection, regulated by a valve 764, permits washing any mud-like deposits which might form in the vicinity of the combustion products dewpoint, from the hot side of the boiler 744.

Having been reduced in pressure to near atmospheric in the let-down valve 760, cooled ash slurry enters an ash settler 766 in which gravity causes the solid particles to concentrate in a conical bottom section, from which they are withdrawn from the apparatus for disposal through a line 768. The aqueous liquid in the upper portion of the settler 766, from which most of the solids have been separated, flows to a solution pump 770 which moves it to a point of division between a portion which is purged from the apparatus via a line 772 and a portion, known as external recycle, which returns to the grinding and slurrying system 704 through the line 708.

Referring again to the flue gas dehydrator 746, wet flue gas separated from ash slurry in the separating zone 748 flows upward through the rectification zone 750, in counter-current contact with a descending cascade of cooled water circulated by a circulating reflux pump 774, which takes suction from a partial draw-off boot 776 located in the lower part of the zone. This multistage contacting cools the flue gas and condenses from it most of the water vapor it contained when separated from ash slurry. The condensed water flows downward over the lower contacting elements, washing the rising wet flue gas free of entrainment. It then joins the ash slurry in the bottom of the dehydrator 746.

The pump 774 discharges hot water, approaching in temperature the wet flue gas rising from the separating zone 748, to a secondary circulating reflux-boiler feedwater exchanger 778 and a circulating reflux-flue gas exchanger 780. Indirect transfer of heat to boiler feedwater in the exchanger 778 cools that portion of the circulating water to a temperature suitable for returning to the rectification zone 750 as intermediate reflux. Indirect transfer of heat to dehydrated flue gas in the exchanger 780 and to cold boiler feedwater in a primary circulating reflux-boiler feedwater exchanger 782 cools the other portion of the circulating water to a temperature suitable for returning to the rectification zone 750 as top reflux.

Cooled and dehydrated flue gas leaving the top of the rectification zone 750 passes through a mist extractor 784 to free it of entrained water droplets and is then reheated, successively, in the circulating reflux-flue gas exchanger 780 and the flue gas reheat exchanger 740. The hot flue gas is then expanded through a flue gas turbine 786, which delivers mechanical energy in the form of shaft horsepower to the air compressor 722.

In the event that the air compressor 722 is comprised of more than one stage, the flue gas turbine 786 will usually be divided into the same number of stages, with interstage flue gas being reheated by an exchanger, or exchangers, in parallel with the flue gas reheat exchanger 740.

Having been partially cooled by giving up energy in the turbine 786, the expanded flue gas, now at a pressure only slightly above atmospheric, flows through an economizer exchanger 788, in which it is further cooled by indirect exchange with low pressure boiler feedwater, before being released to the atmosphere through a suitable vent 790.

High quality boiler feedwater is supplied from outside the apparatus, under pressure from an offsite pump, through a line 792 in the primary circulating reflux-boiler feedwater exchanger 782, from which the warmed feedwater flows to the secondary circulating reflux-boiler feedwater exchanger 778. Heated feedwater from the exchanger 778 is held briefly in a feedwater accumulator 794 from which any gases liberated by the feedwater heating are vented through a valve 796. From the bottom of the accumulator 794 the de-aerated feedwater flows to the suction of a high pressure boiler feedwater pump 798 which delivers it under sufficient pressure to cause it to flow to the reactor concentric pipes 730a, b and c. In some cases, the high pressure feedwater may be further preheated by exchange with combustion products by means of an exchanger (not shown) located in the manifold 742.

Before entering the concentric pipes, which operate in parallel with respect to feedwater and steam, the preheated feedwater joins with recirculated feedwater from the bottom of a high pressure steam drum 800. In the concentric pipes heat transferred from reactor contents converts part of the combined feedwater to steam. A two-phase water-steam mixture leaves the concentric pipes and flows via a line 802 to the steam drum 800. The difference in density between water in the feedwater recirculation line and the water-steam mixture in the line 802 sets up a hydraulic driving force which causes water to circulate from the bottom of the drum 800 through the concentric pipes and back to the drum 800.

In the drum 800 steam separates from water and leaves through a mist extractor 804, which purifies it of entrained droplets on its way to the steam superheat exchanger 738 in which, as previously described, it is superheated by transfer of heat from hot combustion products before leaving the apparatus via a line 806 as a main product of the process.

Dissolved solids brought into the apparatus with the feedwater tend to accumulate in the water in the steam drum 800 and have to be purged from the high pressure steam system. Therefore, a small purge stream is withdrawn through a high pressure blowdown valve 808.

Low pressure boiler feedwater is supplied from outside the apparatus, under pressure from an offsite pump, through a line 810 to the economizer exchanger 788, from which the heated feedwater flows to a low pressure steam drum 812. Feedwater flows via a line 814 from the bottom of the drum 812 to join with high pressure blowdown water from the valve 808 at the cold side inlet of the boiler 744, in which transfer of heat from combustion products converts some of the entering water to steam. A two-phase water-steam mixture leaves the boiler 744 and flows via a line 816 to the steam drum 812. The difference in density between water in the line 814 and the water-steam mixture in the line 816 sets up a hydraulic driving force which causes water to circulate from the bottom of the drum 812 through the boiler 744 and back to the drum 812.

In the drum 812 steam separates from water and leaves through a mist extractor 818, which purifies it of entrained droplets before it leaves the apparatus via a line 820 as a product of the process.

Dissolved solids brought into the apparatus with the low pressure feedwater, as well as those conveyed by the high pressure blowdown, tend to accumulate in the water in the steam drum 812 and have to be purged from the low pressure steam system. Therefore, a small purge stream is withdrawn through a low pressure blowdown valve 822 and may be disposed conventionally or used as make-up water to the fuel grinding and slurrying system 704.

DESCRIPTION OF THE INVENTION

It has long been accepted that the efficient combustion of coal and other carbonaceous fuels requires high temperatures, which have the unfortunate consequences of forming pollutants difficult and expensive to control (sulfur dioxide, nitrogen oxides and powdery ash). Furthermore, these temperatures call for expensive materials of construction and frequently cause fouling of the apparatus with slag or clinker. I have discovered that such fuels can be burned with at least equal efficiency at temperatures which, although above the critical temperature of water, are significantly below the conventional range. These low temperatures, made possible by the presence of water and alkali, result in a flue gas essentially free of sulfur and nitrogen oxides. The water, moreover, permits washing the flue gas free of the fine solid particles it ordinarily carries.

It is also the conventional wisdom that fuels must be as dry as possible because flue gases carry with them as a heat loss the latent heat of evaporation of any water entering the system. I have discovered that, with the proper choice of combustion pressure, even very wet fuels such as coal slurry, garbage and agricultural wastes can be burned at thermal efficiencies formerly reserved for dry fuels.

Any solid or semi-solid combustible material, which can be reduced in particle size so as to form a fluid or semi-fluid slurry with water or alkaline solution, can be used as fuel for my process. Since sulfur is almost quantitatively converted to alkali sulfate, ash particles are retained in an aqueous slurry and water rejected as liquid water, it is particularly advantageous for fuels whose contents of these impurities render them unattractive for conventional combustion.

Although particle size can affect carbon conversion, fineness determined by slurry concentration and pumpability is usually satisfactory. Carefully sized coal particles treated with a surfactant have been pumped at water:dry fuel ratios as low as 0.33:1. However, in my process, the incentive for achieving such low ratios is usually small, and may not justify extra grinding and/or classification expense. With most coals a slurry ratio of around 1:1 is considered more realistic. Fibrous fuels, such as wood and agricultural wastes, usually require higher slurry ratios.

Recycled solution ordinarily furnishes most of the liquid needed to make up the fuel slurry. If not already present, water is added as required to obtain the desired consistency. Make-up water does not have to be purified, in fact may, in some cases, utilize water unfit for other purposes.

While my process affords considerable latitude in water:fuel ratio, ratios as high as 10:1 impose undesirable pumping and heat transfer expense and restrict the flexibility of the combustion itself. In such cases, it may be preferable to employ a pre-treatment for freeing part of the bound water. Among those most appropriate are slurry phase carbonization and Wet Air Oxidation.

When the fuel contains appreciable sulfur, alkali is added to the fuel slurry in an amount somewhat in excess of its chemical equivalent as alkali sulfate. The excess not only insures essentially complete removal of sulfur but, as is known, catalyzes combustion of carbon, helping to obtain a high conversion at relatively low temperature and/or excess air. Even if the fuel contains little or no sulfur, alkali may be added for its catalytic effect. On the other hand, some fuels, particularly lignites, contain sufficient alkali that addition is unnecessary. Also, some fuels contain other natural combustion catalysts so that alkali catalysis may be redundant. While not ordinarily required, extraneous catalysts other than alkalis may also be added to the fuel slurry.

Usually, the most economical alkali is some form of ground or powdered limestone, although dolomites and dolomitic limestones may also be used. Soda ash (sodium carbonate) is an excellent sulfur removal agent and catalyst but is usually more expensive than limestone. Also, since sodium salts are more water soluble than calcium salts, the use of soda ash may create a water pollution problem. In special cases a mixture of alkalis, such as limestone and soda ash, may be advantageous.

The fuel slurry is preferably delivered to the pressure of the combustion reactor by means of slurry pumps although other known methods of charging slurries to pressurized systems, such as blow cases, hydraulic displacement, etc. may be used.

Pressurized fuel slurry is preferably preheated by heat exchange before entering the reactor. Although, as with process systems in general, there are alternative heat exchange possibilities, it is frequently logical to exchange heat between outgoing ash or fines slurry and incoming fuel slurry. These streams tend to be well balanced in quantity, pressure and temperature range.

In some cases fuel slurry may be further preheated by exchange with hot combustion products, or the combustion reaction itself, as in the embodiment of FIG. 4. At subcritical pressures, i.e., below about 3,200 psi, the practical extent of preheating may be limited by vaporization of slurry water. When slurry pressure is above the critical, vaporization is not a preheat limiting factor.

Carbonaceous fuels, especially those of lower rank, may be altered appreciably during the preheating step. Such fuels contain heat unstable oxygenated compounds which tend to split off carbon dioxide and water and condense to a more coal or coke-like structure. Substantial amounts of water, virtually inseparable at ordinary temperatures, may be set free in the process, which I shall call carbonization. Since fuel slurry will be preheated, in many cases, well into or beyond the carbonization range (typically 300°–450°), it may be quite feasible to interrupt the preheating at an appropriate temperature to perform a separation of excess water. Equipment for this primary preheating, carbonization and separation need be designed only for sufficient pressure to maintain slurry water in liquid phase. Only the concentrated slurry need be pumped to full combustion pressure and given its full preheat. Separated water may be subjected to heat recovery and returned, in part, to the fuel slurrying system. Soluble organic compounds in this water may, however, be diverted to chemical use.

Since thick slurries have relatively poor heat transfer coefficients exchanger surface for heating them indirectly can be expensive. A useful alternative, particularly for fuels which tend to carbonize during preheating, is to preheat them by direct counter-current contact with wet flue gas, from which most of the high level heat has been recovered but which still contains lower level sensible and latent heat. Such an exchange serves simultaneously to cool and dehydrate the flue gas, resulting in a dilution of the slurry. The diluted slurry may be concentrated, as by hydraulic cyclone, before charging to the reactor.

When certain coals are heated they become plastic and sticky, often giving rise, in conventional processes, to fouling and blockage. In my process, since fuel is preheated in slurry form, each particle is insulated from its neighbors by an aqueous film which prevents sticking or agglomerization.

Other fuels, although solid at atmospheric temperatures, can be melted by heating so as to be stored and pumped as a liquid. It may be convenient to pump and preheat such fuels separately from the alkali and slurry water equivalent, mixing them (along with preheated air) at the reactor inlet.

Water supplied with the fuel slurry may be supplemented by water recycled from within the pressurized portion of the apparatus (pressurized system). This water, known as internal recycle, is usually at least partly in the form of ash or fines slurry. The ratio of internally recycled water to fuel slurry water may be as high as 10:1 with concentrated fuel slurries and comparatively low combustion temperatures. However, with dilute fuel slurries and/or reactor heat transfer, little or no internal recycle may be required. This recycle may join the fuel slurry and the air at the reactor inlet, in whole or in part, or it may be injected into the reactor at one or more points downstream of the inlet.

The primary determinant of internal recycle quantity is the final combustion temperature desired. Increasing the rate of recycle lowers the temperature and vice versa. By injecting the recycle at more than one point, control can be exercised over temperature profile as well. Recycling of any unconverted carbon in the ash helps to achieve a high overall conversion and the increased concentration of water vapor during combustion promotes carbon conversion and influences sulfur oxidation toward the preferred sulfate form.

For convenience, I describe my process with reference to atmospheric air as the source of combustion oxygen. It is to be understood, however, that any oxygen-containing gas, such as commercial oxygen or enriched air, may be substituted for ordinary air. Such substitution, while it may involve extensive quantitative adjustments, requires no substantial alteration to the inventive concepts described.

Combustion air may be raised to reaction pressure (or slightly above) by any of the known types of compressors. It is usually most economical, however, to use one of the turbo-compressor types, such as axial-flow and/or centrifugal. Since such machines are limited in compression ratio per machine, two or more machines (stages) in series may be required.

Nearly all the energy put into a compressor is converted to heat, raising the temperature of the compressed air. Such heating in the final stage comprises preheat useful in the combustion. However, air compressed in lower stages must normally be cooled before entering the next higher stage, to minimize horsepower and avoid excessive machine temperatures. Coolers between stages are referred to as intercoolers. Heat removed in intercoolers may be utilized to heat any cooler fluid, such as boiler feedwater, flue gas or a process stream from an associated industrial unit.

What I shall refer to as "basic reactor preheat" comprises air heated only by the last stage of compression and fuel slurry preheated only by exchange with ash or fines slurry. The basic preheat is usually insufficient to vaporize all of the fuel slurry water in the reactor inlet zone although enough is vaporized to cause an appreciable temperature drop. By inlet zone I mean that part of the reactor space immediately following the mixing of fuel slurry and air, before appreciable combustion has taken place. A higher inlet zone temperature may be realized by mixing the fuel slurry with the internal recycle, which is usually a little hotter. However, this practice increases the liquid water in the zone.

In a 4000 psi example, air at 555° and 60:40 water:coal slurry at 600° produced a calculated mix temperature of about 445°. Including the internal recycle at 650° in the inlet mixture raised the calculated inlet zone temperature to about 555°.

Relatively low inlet zone temperatures result in relatively low initial combustion rates so that extra reactor volume may have to be provided to achieve essentially complete combustion. Of course, combustion rates are also a function of the reactivity of the fuel. When charging comparatively reactive fuels, roughly from biomass to lignites, inlet temperatures obtainable with the basic preheat may be satisfactory. On the other hand, with most coals higher inlet temperatures are preferable.

Liquid water, per se, does not usually cause problems in the reactor so long as it is present in sufficient amount to form a liquid slurry. As temperature rises and evaporation proceeds, however, the liquid:solids ratio can fall into a non-fluid (mud-like) region. Furthermore, the aqueous phase may contain scale-forming mineral salts which can adhere to wall surfaces as the solution becomes super-saturated. Some fuels can be made to remain dispersed even at low liquid:solids ratios and also carry along potentially scale-forming minerals. With others, it is more satisfactory to avoid conditions resulting in low liquid:solids ratios.

It is possible to keep away from non-fluid ratios either by augmenting the liquid phase, or by dispensing with liquid phase altogether. By charging sufficient water to the inlet zone, as fuel slurry water and internal recycle, and operating at sufficiently high pressure, it is possible to maintain a fluid slurry up to the water critical temperature (beyond which liquid and vapor become identical). These constraints, however, are not always attractive so it is frequently preferable to go to the opposite extreme of avoiding liquid in the reactor entirely. This may be accomplished by providing enough heat in the inlet zone to vaporize all of the fuel slurry water or reach a mix temperature above its critical. In this mode, most or all of the internal recycle is added downstream of the inlet where combustion heat is available to vaporize it. A further benefit is the higher initial combustion rate accompanying the increased inlet zone temperature.

In the several embodiments, combustion takes place largely, or entirely, at temperatures above the critical temperature of water. So long as the pressure is subcritical, i.e., below about 3200 psi, water exists in the form of superheated vapor. When both temperature and pressure are above the critical there is no distinction between phases. However, even in this region, mixtures of water with air or flue gas exhibit the characteristics of a gas so, for convenience, I refer to water in such a mixture as vapor and the phase change from liquid to this condition as vaporization.

Among the means available for augmenting inlet zone heat input are (a) additional air and/or fuel slurry preheat, (b) injecting superheated stem into the zone, (c) staged injection of fuel slurry and (d) recycling of hot combustion products.

(a) Air is the simplest reactant to preheat. Having been filtered before compression, it is clean and has precisely known characteristics. High temperature heat is available from combustion products and/or from the heat of combustion. The embodiments of FIGS. 1, 2 and 6 utilize air preheated by exchange with combustion products. The reactor concept diagrammed in FIG. 3 illustrates air preheat by exchange with the combustion itself. In many cases, particularly with low slurry water:fuel ratios, air preheat in addition to the basic preheat is sufficient to vaporize slurry water and provide an adequate inlet zone temperature.

When, for the 4000 psi example previously cited, air was preheated to 1000°, all of the fuel slurry water was vaporized, the calculated inlet zone temperature being about 655°.

As already noted, some fuels require a high slurry water ratio. Particularly with such fuels, additional fuel slurry preheat may be useful, noting that vaporization may occur if pressure is below the critical. The reactor concept diagrammed in FIG. 4 illustrates fuel slurry preheat by transfer of combustion heat.

(b) Since a primary purpose of internal recycle is to cool the combustion, keeping temperatures low enough to avoid sulfur dioxide, it seems contradictory to vaporize and superheat some of it to assist in vaporizing fuel slurry water. Nevertheless, in cases for which feasible air and fuel slurry preheat are inadequate, this is an alternative available. The embodiment of FIG. 1 illustrates this alternative. Recycle for the purpose is taken from the solids-free circulating reflux stream. Superheated steam generated from externally supplied water of suitable quality may be similarly used.

(c) FIG. 2 illustrates an embodiment in which only a portion of the fuel slurry is initially mixed with, and vaporized by, all of the preheated air. Heat of combustion of some of the initial portion of fuel raises the temperature of the flowing mixture to the extent that it is capable of vaporizing the water in another portion of fuel slurry, injected some distance downstream, without serious drop in temperature, and so on until all portions of the fuel slurry (which are not necessarily of equal size) have joined the reacting mixture. Further regulation of reactor temperature profile may be exercised by adding controlled amounts of internal recycle along with one or more of the fuel slurry portions and at subsequent injection points. Frequently, only air preheat is required with this technique although additional fuel slurry preheat may be advantageous in cases of high water:fuel ratio.

When, in the 4000 psi example previously cited, only half of the fuel slurry was initially mixed with 1000° air, the calculated inlet zone temperature increased to about 800°, and when the initial slurry injection was reduced to one-third (as in the embodiment of FIG. 2) it increased further to about 860°.

(d) FIG. 5 illustrates a reactor embodiment in which hot combustion products from the reactor outlet zone are recycled to the inlet zone, raising its temperature and assisting in vaporizing fuel slurry water. An advantage of this alternative is that it does not require heat transfer surface. With high ash fuels it may be preferable to pass the combustion products through a conventional gas-solids separating device before recycling.

It will be apparent that various combinations of the foregoing means of augmenting inlet zone heat input may be advantageous in some cases.

Regardless of the pattern of fuel slurry injection it is important that it mix rapidly and thoroughly with the air or oxygen-containing fluid present at the point of injection. Any of the devices for mixing fluids known to the combustion, chemical or engineering arts may be employed for this purpose. Burner concepts used with heavy fuel oils, coal-oil slurries or pulverized coal are useful, providing design adjustment is made for the volume and density of the air. Likewise, spray drying art provides dispersing and mixing techniques which may be adapted, particularly for those cases in which slurry water is completely vaporized at the point of mixing. Similar mixing considerations apply at downstream points of injecting fuel slurry increments and/or internal recycle. However, the flow at these points may already be sufficiently turbulent that comparatively simple injection nozzles are adequate.

To be suitable for the process of this invention, a reactor must be at least partially adiabatic, i.e., heat of combustion must be at least partially applied to raising the temperature of the reactants flowing through it. However, some of the combustion heat may be extracted by indirect heat transfer, as to boiling feedwater, so long as the amount extracted is less than the total liberated. Also, as explained above, heat may be extracted to preheat one or more of the reactor inlet streams although such exchange is a heat recycle and does not change the net heat output of the reaction system.

A suitable length of pipe or tubing, or lengths connected by 180 degree bends, may comprise an efficient and economical reactor. In such cases, diameters are preferably chosen to provide fluid velocities in the turbulent-flow range. Reactor passes may be arranged horizontally or vertically. When heat exchange is incorporated into the reactor design, this portion of the apparatus may be similar or identical to commercial types of double-pipe heat exchangers. For larger capacities a plurality of parallel pipe and/or double-pipe reactors may be used. There may be, for example, the same number of parallel reactors as flue gas turbine stages, with reactors and corresponding flue gas reheat exchangers arranged as parallel reaction "trains".

Jacketed pipe reactors, such as those of FIGS. 3 and 4, while more complicated than unjacketed ones, may actually be cheaper to construct. With suitable instrumentation, it is possible to design the inner (hotter) shell for only a moderate differential pressure, the cooler outer shell being designed for full system pressure. Thus advantage may be taken of the higher stresses allowable in construction steels at lower temperatures.

Although tubular reactors are frequently economical, other reactor types providing suitable mixing and retention time may be substituted. For example, a cylindrical pressure vessel, or a plurality of such vessels, may be employed. Such reactors may be equipped with baffles, mechanical agitators or other means of mixing enhancement.

When charging a sulfur containing fuel, the chemical objectives of the combustion may be stated as oxidizing the carbon, hydrogen and sulfur of the fuel to, respectively, carbon dioxide, water vapor and (aided by alkali) alkali sulfate, with liberation of the corresponding heats of reaction. Conversion of carbon does not have to be 100.0 percent but, for reasons of fuel economy, should exceed 90, and preferably 95, percent. Under any conditions suitable for carbon conversion, that of hydrogen may be assumed. Concern for sulfur conversion focuses on achieving the sulfate form to the virtual exclusion of the dioxide, or sulfite, form.

Conversion of carbon is favored by increase of temperature, pressure, time, excess air, water vapor and alkali, except that excessively high temperature can result in appreciable formation of the undesirable monoxide. It is noteworthy that all of the conditions favoring carbon conversion also favor sulfate, with the conspicuous exception that the temperature resulting in an undesirable lower oxide is much lower. The chemical objectives are, therefore, achieved by deploying a combination of the other carbon-converting conditions such that temperature does not have to be so high as to produce appreciable sulfur dioxide. In other words, in the preferred temperature range, oxygen, water, alkali and pressure cooperate, through the Law of Mass Action, to convert sulfur almost quantitatively to alkali sulfate.

When the fuel does not contain appreciable sulfur, chemical objectives are correspondingly simplified. With only carbon and hydrogen conversion to be considered there is increased latitude in choice of operating conditions.

The powerful effects of water vapor pressure on carbon conversion have been demonstrated by passing a steam-air mixture through a sample of North Dakota lignite at a temperature of 750° and a pressure which decayed from 3500 to 1500 psi in 17 seconds. The resulting ash contained no detectable carbon, indicating that water vapor concentration, pressure and/or time could probably have been reduced. While my process can burn such reactive fuels at temperatures as low as 750° and, at the opposite extreme, temperatures as high as 1600° can be used, a range of about 1000° to 1300° is preferred. Comparatively low temperatures tend to limit the usefulness of product heat or steam whereas comparatively high temperatures require expensive materials of construction, increase equipment wear and tear and may compromise the very high degree of sulfur removal and alkali utilization realized in the preferred range.

As already pointed out in this description and copending Ser. No. 948,682 (now U.S. Pat. No. 4,292,953), some of the combustion heat may be extracted from the reactor by indirect heat transfer. This is one of the means available for limiting temperature to the desired level. Another is the injection of recycled water (internal recycle). The former has the advantage of comprising a comparatively high temperature heat source suitable, for example, for generating steam at pressures higher than system pressure, even at super-critical pressures. The latter permits more precise temperature regulation and, by augmenting water vapor concentration, aids carbon and sulfur oxidation. Either or both methods may be used but, in most cases it is considered preferable to retain at least some internal recycle.

For discussion of system pressure, it is convenient to divide embodiments into two groups: those, such as FIGS. 1 and 2, in which combustion temperature is limited by the injection of water and those, such as FIG. 6, in which indirect transfer of combustion heat takes a primary temperature limiting role. To simplify this discussion it will assume that water comes from internal recycle and product heat is delivered as steam.

In the former (high recycle) cases, a large part of the liberated heat leaves the reactor as latent heat of water vapor. To utilize this latent heat for generating steam, system pressure must be higher than steam pressure. For example, to so generate 2000 psi steam, system pressure needs to be appreciably higher than 2000 psi. On the other hand, generation of lower pressure steam permits a corresponding reduction in system pressure.

In the latter (low recycle) cases, the pressure of steam generated by means of reactor heat transfer surface (primary steam) is independent of system pressure. Although that generated by condensing the diminished recycle water (secondary steam) remains tied to system pressure, its importance in an overall energy balance may not justify a pressure comparable to primary steam pressure. Instead, it may be determined on the basis of adequate carbon conversion and/or sulfur dioxide suppression. Actually, several variables enter into this determination: fuel reactivity and sulfur content, combustion temperature, water vapor concentration, alkali, reaction time and process economics. With fuels of low rank and sulfur content, primary steam of any desired pressure can be generated, from the standpoint of conversion, with system pressures ranging down to little above atmospheric. The most economical pressure may, however, be higher than the minimum possible.

One of the economic considerations is local use for low level heat and its effect on flue gas water vapor content. For example, at 250 psia flue gas cooled to about 240° carries no more water vapor than typical for conventional combustion. At 125 psia, it would have to be cooled to about 200° and at 60 psia about 170°, using this rather arbitrary criterion. In practice, with high pressure systems flue gas will frequently carry less than the conventional water vapor, and with low pressures somewhat more.

For convenience in describing heat recovery and phase separation I shall refer to heat at a temperature sufficient to generate product steam as high level heat. High level heat in combustion products may be utilized in several ways. A primary use will usually be to generate and superheat steam, and this steam may also be reheated after one or more stages of expansion in an associated turbo-generator installation. It is usually advantageous also to apply some of the high level heat to reheating flue gas before expansion. Some may be recycled to the combustion in the form of air and/or fuel slurry preheat. Other uses include supplying reaction heat to endothermic chemical reactions and, in general, to any industrial process or material requiring relatively high level heat.

In the field of Enchanced Oil Recovery, superheated steam generated from such embodiments as FIGS. 1, 2 and 6 may be used directly for steam flooding, or the superheater may be omitted, saturated steam from the respective steam drum being injected into the formation. Flue gas under pressure, as from the tops of the flue gas dehydrators, may be directed to the formation for purposes of repressuring. Furthermore, steam-flue gas mixtures may be directed to enhanced recovery to any stage from the reactor outlet to the outlet of the boiler. Hot dust separation may be by known dry methods, such as multi-stage cyclones, precipitators or filters. But an unique advantage, compared with other solid fuel combustions, is the ability to clean the gas mixture, at reduced but still comparatively high temperature, by washing with hot aqueous condensate. If desired, the washed mixture may be superheated by indirect exchange with hot combustion products, similarly as illustrated for product steam. Steam, flue gas or their mixtures may be so manufactured at whatever pressure is necessary to deliver them at the desired wellhead pressure.

When commercial oxygen is substituted for combustion air, gas leaving the dehydrator is a high quality carbon dioxide suitable for miscible flooding. Steam-carbon dioxide mixtures may also be delivered in a manner similar to that described for steam-flue gas mixtures in the preceding paragraph.

As combustion products are cooled, in the course of transferring high level heat, the dewpoint is reached and water vapor begins to condense to liquid water. A difficulty is sometimes encountered, when cooling dust-containing gases, with plugging of equipment in the vicinity of the dewpoint. This is because, for a short distance of travel, liquid droplets attract solid particles and form a non-fluid mixture. Should this difficulty arise, in apparatus for the process of my invention, it may be overcome by injecting hot water, or fluid slurry, as from the discharge of the circulating reflux or ash or fines slurry recycle pumps of FIGS. 1, 2 and 6, upstream of the condition.

Combustion heat remaining in the flue gas and ash or fines slurry, after maximum recovery of high level heat, is subject to further recovery by transfer to relatively cold incoming streams, principally fuel slurry and boiler feedwater. It will be apparent to those skilled in the art that numerous alternative arrangements for recovering this heat may be used, depending upon such local circumstances as the temperature at which boiler feedwater is returned to the apparatus. When the invention is utilized to supply power and heat for process purposes there are frequently opportunities to transfer part of the low level heat to cooler fluids in the associated process plant.

Although conventional heat exchangers may be used for recovering low level heat from flue gas, the method I have chosen to illustrate comprises direct contact with recirculating water, which subsequently transfers this heat indirectly to dried flue gas and boiler feedwater. The circulating water also scrubs the flue gas clean of dust particles before it goes to the turbines. I consider this effective cleansing an important advantage when compared with less effective dry dust removal methods employed in other solid fuels combustion processes. While ordinary vapor-liquid contacting elements, such as bubble or perforated trays or tower packing, are generally adequate for the purpose, it is entirely feasible to substitute special gas washing devices for some or all of the contacting elements.

Circulating water may be alkalized to neutralize traces of acid gas remaining in the wet flue gas, or the cooling and scrubbing may be divided into sections, one of which utilizes alkalized water.

The embodiments of FIGS. 1 and 2 illustrate the compression of air in three stages whereas that of FIG. 2 illustrates a single-stage case. When capacity is large and/or operating pressure comparatively high, it may be advantageous to compress the air in four stages. When compressors and turbines are in power balance, as in the embodiments of FIGS. 1 and 6, it is usual, but not obligatory, to expand the flue gas in the same number of stages as employed for air compression. When the turbines are set up for export of power, above that needed for compression, as in the embodiment of FIG. 2, the number of turbine stages may exceed the number of compressor stages. On the other hand, when capacities are small and/or system pressures low, no flue gas turbine may be justified.

While FIGS. 1, 2 and 6 illustrate a single train of turbo-compressors, it will be apparent that, for very large units, it may be advantageous or necessary to use two or more trains in parallel. Another mechanical alternative applicable to large units, for which shaft diameter may be limiting, is to couple parallel turbines to both ends of the compressor shafts. There would then be, practically speaking, twice as many trains of turbines as of compressors.

From the standpoints of simplicity, ease of operation and equipment economy, a wet ash removal system, as in the embodiments of FIGS. 1 and 6, is preferred. However, the wet ash-spent alkali mixture may present a disposal problem. In such cases a dry system, as in the embodiment of FIG. 2, may be used it being understood that there is extensive art applicable to the details of apparatus and operation of both continuous and intermittent methods of withdrawing powdered solids from pressurized systems.

When a wet system is employed the net production of ash slurry is subjected to heat recovery and then separated into wet ash, for disposition external to the apparatus, and a clarified solution. Although a gravity settler is illustrated in FIGS. 1 and 6 as the solids-liquid separating device, other types of such devices known to the art, for example filters or centrifuges, may be used.

What I have called wet ash will, in most cases charging sulfurous fuels, be mixed with limestone and calcium sulfate gypsum. While the latter is more-or-less the equivalent of the scrubber sludge which would have been produced in a conventional flue gas scrubber, the fully oxidized sulfate is more easily dewatered and structurally stable. The presence of ash further stabilizes the gypsum resulting in a wet solids disposal situation less unfavorable than with conventional scrubbing.

All of the solution separated from the ash may be discarded. However, part is normally recycled to the fuel slurrying system (external recycle) and part purged from the system. The purpose of the purge is to reject essentially all soluble impurities from the system. A purpose of the external recycle is to build up the concentration of soluble impurities so that a relatively small volume of purge suffices to remove them at an equilibrium rate. When a soluble alkali is being added to the fuel slurry, external recycling also conserves alkali and, in some cases, salts extracted from the ash have a combustion-promoting effect, lessening the need for excess alkali.

When soda ash is the alkali added to the fuel slurry, sodium sulfate formed from fuel sulfur is water soluble and is purged, along with soluble constituents of the ash, from the clarified solution. These soluble salts may present a disposal problem and may, therefore, be treated with lime or limestone externally to the apparatus to convert them into comparatively insoluble calcium salts, regenerating the soda ash solution for re-use.

When spent solids are withdrawn from the apparatus in dry form it is nevertheless necessary to withdraw a net surplus of water or fines slurry from the pressurized system to maintain a water balance. In most cases, the heat in this hot water or slurry would be recovered by heat exchange, as with fuel slurry, or by flashing to produce intermediate and/or low pressure steam useful for auxiliary purposes. Except for a light loading of essentially insoluble dust, this water is much less contaminated than solution separated from wet ash and is usually suitable for reuse in the fuel slurrying system without the necessity for purge. Depending upon water balance of the particular case, however, there may be an excess above fuel slurry requirements.

Apparatus for my process, unlike conventional boilers, is very flexible with respect to fuel properties. Such properties as caking tendency and ash softening point have little or no effect. Increase of sulfur content can usually be compensated for by rate of alkali feed. Oversizing of fuel slurry preparation and charging and ash handling equipment, at minor additional expense, permits operation with fuels of widely varying ash and moisture contents and heating values. In an era of high fuel prices and stringent emissions regulations, this flexibility has great practical value.

Water charged to a combustion reactor in my process, both as fuel slurry and as internal recycle, is necessarily converted to vapor and subsequently re-condensed to liquid. This inherent water distillation cycle can be utilized to produce purified water as a useful by-product. It has already been pointed out that water unfit for other purposes may be used to make up the fuel slurry. It is also possible to substitute low quality water from outside the apparatus for internal recycle, withdrawing its distillation-purified equivalent for priority uses.

Water condensed in the flue gas dehydrators of the illustrated embodiments, or equivalent, is essentially solids-free. In the embodiment of FIG. 1, this purified water is used as a medium to transfer combustion heat to the inlet zone of the reactor and is thus unavailable as a by-product. In other embodiments, such as that of FIG. 2, however, it is possible to draw as much as several times the fuel slurry water from the circulating reflux system. To maintain an internal water balance it is necessary to replace most of it from an external source. Heat in the outgoing purified water would normally be recovered by indirect heat exchange with incoming replacement water.

Purification of even greater amounts of water may be accomplished by condensing water from combustion products in two stages, as in the embodiment of FIG. 2 of co-pending application Ser. No. 948,682 (now U.S. Pat. No. 4,292,953). Only sufficient water is condensed in a primary boiler to adequately slurry and remove ash, spent alkali and soluble salts. Water condensed in a secondary boiler, as well as in the flue gas dehydrator, is then solids-free and may be subjected to heat recovery and sent to storage as a valuable by-product.

Having described my invention, I claim:

1. A continuous pressurized combustion process comprising the steps of:
   preparing an aqueous slurry of fuel particles containing alkali in an amount at least the chemical equivalent of the sulfur in the fuel as alkali sulfate;
   pressurizing the fuel slurry;
   preheating the fuel slurry;
   pressurizing an oxygen-containing gas;
   preheating the oxygen-containing gas;
   mixing the preheated fuel slurry and the preheated oxygen-containing gas at the entrance to an inlet zone of an elongated combustion reactor, forming a gaseous phase comprising the oxygen-containing gas and water vapor in which the fuel and alkali particles are entrained;
   providing a water vapor pressure of at least 3 atmospheres in the gaseous phase, as measured at the outlet of the reactor:
   permitting the fuel particles to burn at a temperature not exceeding 1600° F. as the gaseous phase flows from the inlet zone to the reactor outlet, forming gaseous and entrained solid combustion products;
   cooling the combustion products at essentially combustion pressure, by extracting useful heat therefrom, to a temperature below their dewpoint; and
   separating from uncondensed gaseous products an aqueous condensate containing suspended and dissolved solid products.

2. A process as in claim 1 and which also comprises the step of mixing steam with the preheated fuel slurry and the preheated oxygen-containing gas at the entrance to the inlet zone.

3. A process as in claim 1 and which also comprises the steps of:
   dividing the preheated fuel slurry into at least two portions;
   mixing one portion with the preheated oxygen-containing gas at the extrance to the inlet zone; and
   injecting remaining portions into the reactor downstream of the inlet zone at intervals such that combustion of previously injected fuel has increased the heat content of the gaseous phase at least sufficiently to vaporize the water in the portion.

4. A process as in claim 1 and which also comprises the step of recycling uncooled combustion products to the inlet zone in an amount sufficient to appreciably increase the temperature in the zone.

5. A process as in claim 1 and which also comprises the step of exposing the gaseous phase in which the burning fuel particles are entrained to heat transfer surface through which sufficient heat is extracted that the temperature in the reactor does not exceed a predetermined maximum.

6. A process as in claim 1 and which also comprises the step of injecting water into the reactor, downstream of the inlet zone, in an amount such that the temperature in the reactor does not exceed a predetermined maximum.

7. A process as in claim 6 and which also comprises the steps of:
   dividing the water injected into the reactor downstream of the inlet zone into at least two portions; and
   injecting the portions at intervals such that the reactor temperature prior to each injection does not exceed a predetermined maximum.

8. A process as in claim 6 in which the water injected downstream of the inlet zone is at least partially comprised of the aqueous condensate separated from the uncodensed gaseous products.

9. A process as in claim 1 and which also comprises the step of passing the gaseous and entrained solid combustion products through a gas-solids separating device, forming a dry solids product and cleaned combustion products carrying unseparated fine solid particles.

10. A process as in claim 9 and which also comprises the step of recycling uncooled cleaned combustion products to the inlet zone in an amount sufficient to appreciably increase the temperature in the zone.

11. A process as in claim 1 and which also comprises the step of further cooling the uncondensed gaseous products, by the extraction of useful heat therefrom, so as to condense a second aqueous condensate essentially free of solid particles.

12. A process as in claim 1 and which also comprises the step of cooling and washing the uncondensed gaseous products with a recirculating stream of water, which has been cooled by the extraction therefrom of useful heat, freeing them of traces of solid matter and reducing their water vapor content to less than 12 volume percent.

13. A process as in claim 12 and which also comprises the step of adding alkali to the recirculating stream of water.

14. A continuous pressurized combustion process for hydrophilic fuels characterized by a content of bound water, not separable by mechanical means, in excess of 35 weight precent comprising the steps of:
   preparing an aqueous slurry of hydrophilic fuel particles;
   pressurizing the fuel slurry;
   preheating the fuel slurry to a temperature at which the molecular structure of the fuel undergoes a spontaneous modification, freeing formerly bound water:
   separating freed water, forming a concentrated fuel slurry;
   pressurizing an oxygen-containing gas;
   mixing the concentrated fuel slurry and the oxygen-containing gas at the entrance to an inlet zone of an elongated combustion reactor;
   permitting the modified fuel particles to burn at a temperature not exceeding 1600° F. as the mixture flows from the inlet zone to the reactor outlet, under a water vapor pressure, measured at the outlet, of at least 3 atmospheres, forming gaseous and entrained solid combustion products;

cooling the combustion products at essentially combustion pressure, by extracting useful heat therefrom, to a temperature below their dewpoint; and
separating from uncondensed gaseous products an aqueous condensate containing suspended and dissolved solid products.

15. A process as in claim 14 in which the step of preheating the fuel slurry is accomplished by direct contact with the uncondensed gaseous products, simultaneously cooling them and reducing their water vapor content to less than 14 volume percent.

16. A process as in claim 14 in which the freed water separated from the concentrated fuel slurry comprises a source of the water used to prepare the aqueous slurry of hydrophilic fuel.

* * * * *